United States Patent [19]
Fujita et al.

[11] Patent Number: 6,166,465
[45] Date of Patent: *Dec. 26, 2000

[54] VIBRATION GENERATING MECHANISM USING REPULSIVE FORCES OF PERMANENT MAGNETS

[75] Inventors: Etsunori Fujita; Hiroki Honda, both of Hiroshima, Japan

[73] Assignee: Delta Tooling Co., Ltd., Hiroshima, Japan

[*] Notice: This patent is subject to a terminal disclaimer.

[21] Appl. No.: 09/069,934

[22] Filed: Apr. 30, 1998

[51] Int. Cl.[7] .............................. H02K 37/00; B06B 1/06
[52] U.S. Cl. ...................... 310/80; 310/103; 310/152; 310/20; 310/37; 310/90.5; 310/80
[58] Field of Search ................................ 310/103, 80, 36, 310/37, 15, 20, 12, 152, 90.5; 464/29

[56] References Cited

U.S. PATENT DOCUMENTS

| | | | |
|---|---|---|---|
| 3,609,425 | 9/1971 | Sheridan | 310/103 |
| 4,300,067 | 11/1981 | Schumann | 310/80 |
| 4,950,931 | 8/1990 | Goldenberg et al. | 310/36 |
| 5,633,547 | 5/1997 | Coombs | 310/90.5 |

FOREIGN PATENT DOCUMENTS 36 01 182   7/1987   Germany ................................ 310/36

*Primary Examiner*—Nestor Ramirez
*Assistant Examiner*—Karl Tamai
*Attorney, Agent, or Firm*—Wenderoth, Lind & Ponack, L.L.P.

[57] ABSTRACT

A vibration generating mechanism includes at least first and second permanent magnets spaced from each other with the same magnetic poles opposed to each other. The first permanent magnet is coupled to a link mechanism so that the drive force of a drive source may be transmitted to the first permanent magnet via the link mechanism. A periodic and reciprocating movement of the first permanent magnet relative to the second permanent magnet changes the opposing area thereof, causing vibration of the second permanent magnet.

3 Claims, 14 Drawing Sheets

ATTRACTION

REPULSION

REPULSION

Fig.5
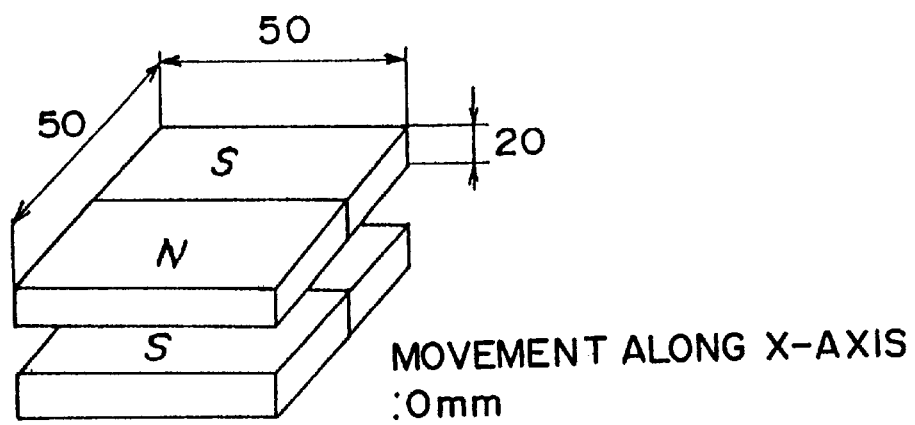
MOVEMENT ALONG X-AXIS
:0mm
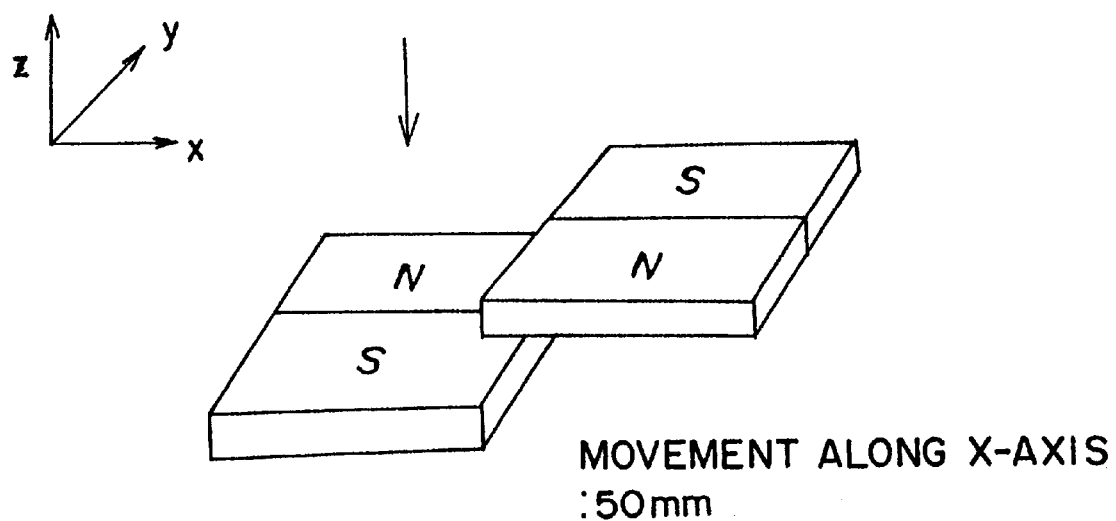
MOVEMENT ALONG X-AXIS
:50mm

VIBRATION GENERATING MECHANISM USING REPULSIVE FORCES OF PERMANENT MAGNETS

BACKGROUND OF THE INVENTION

1. Field of the Invention

The present invention relates generally to a mechanism for generating vibration horizontally or vertically and, in particular but not exclusively, to a vibration generating mechanism for generating vibration energy in either the horizontal direction or the vertical direction by making use of repulsive forces of a plurality of permanent magnets.

2. Description of Related Art

An exciter or vibration generator has been used to artificially generate vibration to investigate vibration characteristics of a structure. Exciters of an electromotive type and those employing an unbalanced mass or a cam are known.

An exciter employing a link mechanism such as, for example, a crank is, however, required to have a relatively large drive motor because a load is directly applied to the drive motor, while an exciter of the electromotive type cannot cope with low frequencies.

Also, because conventional exciters are generally large in size, not only a relatively large space but time-consuming installation work are required. Further, the conventional exciters generate a large amount of heat and, hence, require forced air cooling by a fan or the like, which in turn causes a problem in that noise evaluation cannot be achieved.

In addition, because the conventional exciters are generally of a complicated structure and are, hence, heavy and costly, light and inexpensive ones have been desired.

SUMMARY OF THE INVENTION

The present invention has been developed to overcome the above-described disadvantages.

It is accordingly an objective of the present invention to provide a vibration generating mechanism having a plurality of permanent magnets incorporated therein and capable of realizing a compact and inexpensive exciter with minimal noise emission.

Another objective of the present invention is to provide the vibration generating mechanism of the above-described type which has a simple construction and can be readily manufactured at a low cost.

In accomplishing the above and other objectives, the vibration generating mechanism according to the present invention includes first and second permanent magnets spaced from each other with the same magnetic poles opposed to each other, a link mechanism coupled to the first permanent magnet, and a drive source for driving the first permanent magnet via the link mechanism.

By this construction, when the drive source moves the first permanent magnet periodically and reciprocatingly relative to the second permanent magnet, the opposing area of the first and second permanent magnets is changed, thereby causing the second permanent magnet to vibrate relative to the first permanent magnet.

Because a load applied to the second permanent magnet can be also vibrated together with the second permanent magnet by making use of the repulsive force acting between the first and second permanent magnets, a relatively compact vibration generating mechanism with reduced noise emission can be readily manufactured at a low cost.

In one form of the present invention, the first and second permanent magnets are spaced vertically. In that case, it is preferred that a first pair of permanent magnets and a second pair of permanent magnets be disposed on respective sides of the first and second permanent magnets. Each of the first and second pairs of permanent magnets are spaced vertically with the same magnetic poles opposed to each other. Because a load applied vertically to the second permanent magnet can be supported by means of repulsive forces of the first and second pairs of permanent magnets, the vibration generating mechanism can generate a desired vibration even if a relatively large load is applied thereto.

Advantageously, the vibration generating mechanism further includes a load adjuster coupled to the link mechanism to cancel a horizontal load applied to the first permanent magnet. With the load adjuster, it is not necessary to enlarge the drive force of the drive source, making it possible to make the vibration generating mechanism compact.

In another form of the present invention, the first and second permanent magnets are spaced in a first horizontal direction. In that case, third and fourth permanent magnets are disposed on one side of the first and second permanent magnets and are spaced in the first horizontal direction with the same magnetic poles opposed to each other. By this construction, one of the first and second permanent magnets is caused to vibrate relative to the other in the first horizontal direction, while one of the third and fourth permanent magnets are caused to vibrate relative to the other in the first horizontal direction.

Advantageously, the vibration generating mechanism further includes fifth and sixth permanent magnets spaced in a second horizontal direction generally perpendicular to the first horizontal direction with the same magnetic poles opposed to each other, wherein one of the fifth and sixth permanent magnets is connected to the link mechanism so that a load applied to the first permanent magnet in the second horizontal direction is balanced by a repulsive force acting between the fifth and sixth permanent magnets.

This construction can reduce the drive force of the drive source, thus enabling the vibration generating mechanism to be compact.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 5 is a schematic diagram depicting mutually spaced permanent magnets with the same magnetic poles opposed to each other and also depicting the case where one of the permanent magnets is moved relative to the other (to change the opposing area thereof);

DETAILED DESCRIPTION OF THE PREFERRED EMBODIMENTS

Figures 1, 2:
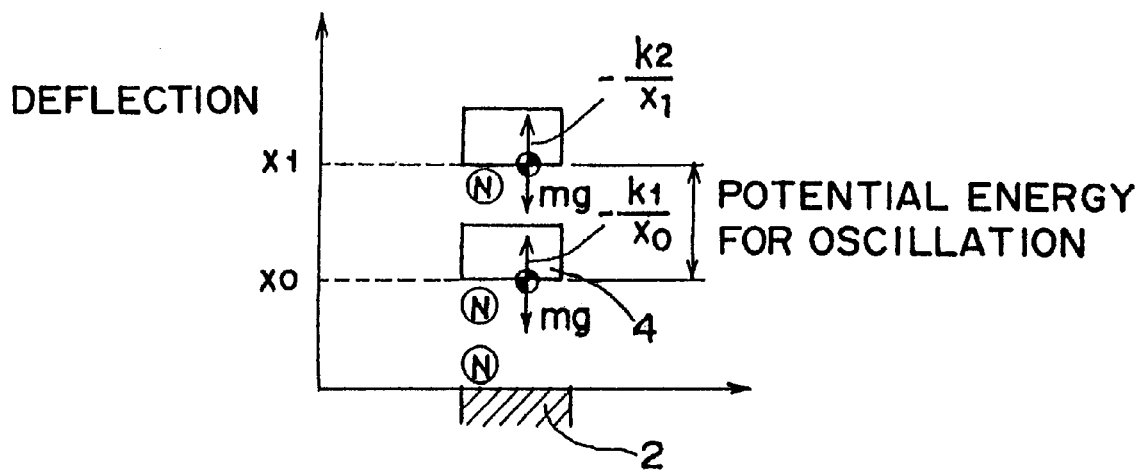
FIG. 1 is a schematic diagram of a magnetic spring applied to a vibration generating mechanism according to the present invention, particularly depicting balanced positions of two permanent magnets on the input side and on the output side.
FIG. 2 is a graph of the fundamental characteristics of the magnetic spring of FIG. 1, particularly showing a relationship between the load applied to one of the two permanent magnets and the deflection thereof from the balanced position.

This application is based on application No. 8-294921 filed Nov. 7, 1996 in Japan, the content of which is incorporated hereinto by reference.

Referring now to the drawings, preferred embodiments of the present invention are discussed hereinafter.

When a magnetic spring structure is made up of at least two spaced permanent magnets with the same magnetic poles opposed to each other, the two spaced permanent magnets are held in non-contact with each other.

Accordingly, if the friction loss in the structure itself is ignored, the static characteristics thereof are reversible, i.e., the output (return) is on the same line as the input (go) and is nonlinear. Furthermore, negative damping can be easily produced by changing the static magnetic field (the arrangement of the magnets) with a small amount of input utilizing the degree of freedom peculiar to the non-contact pair and the instability of the float control system.

The present invention has been developed taking note of this fact. At the time of input (go) and at the time of output (return), the geometric dimensions between the two permanent magnets are changed by a mechanism inside a kinetic system in which the permanent magnets are placed or by an external force. The change in geometric dimensions is converted into a repulsive force in the kinetic system to make the repulsive force from the balanced position of the two permanent magnets greater at the time of output than at the time of input.

The fundamental principle is explained hereinafter.

FIG. 1 schematically depicts balanced positions of two permanent magnets 2 and 4 on the input side and on the output side, while FIG. 2 depicts the fundamental characteristics of the magnetic spring structure indicating a relationship between the load applied to one of the two permanent magnets and the deflection thereof from the balanced position.

As shown in FIG. 1, when the balanced position of the permanent magnet 4 on the input side relative to the permanent magnet 2 and the spring constant of the magnetic spring are $x_0$ and k1, respectively, and the balanced position thereof on the output side and the spring constant are $x_1$ and k2, respectively, an area conversion is performed between $x_0$ and $x_1$, and the following relations hold at respective balanced positions.

$-k1/x_0 + mg = 0$ $-k2/x_1 + mg = 0$ $k2 > k1$

Accordingly, the static characteristics indicate negative damping characteristics, as shown in FIG. 2, and it is conceivable that the potential difference between the position $x_1$ and the position $x_0$ corresponds to the potential energy for oscillation.

A model of FIG. 1 was made and a relationship between the load and the deflection was measured by changing the time during which the load was applied. As a result, a graph shown in FIG. 3 was obtained, which can be interpreted as meaning that when the two permanent magnets 2 and 4 approach their closest position, a great repulsive force is produced, and that when the amount of deflection from the balanced position changes slightly, a friction loss is produced by a damper effect of the magnetic spring, thus creating a damping term.

Figure 3:
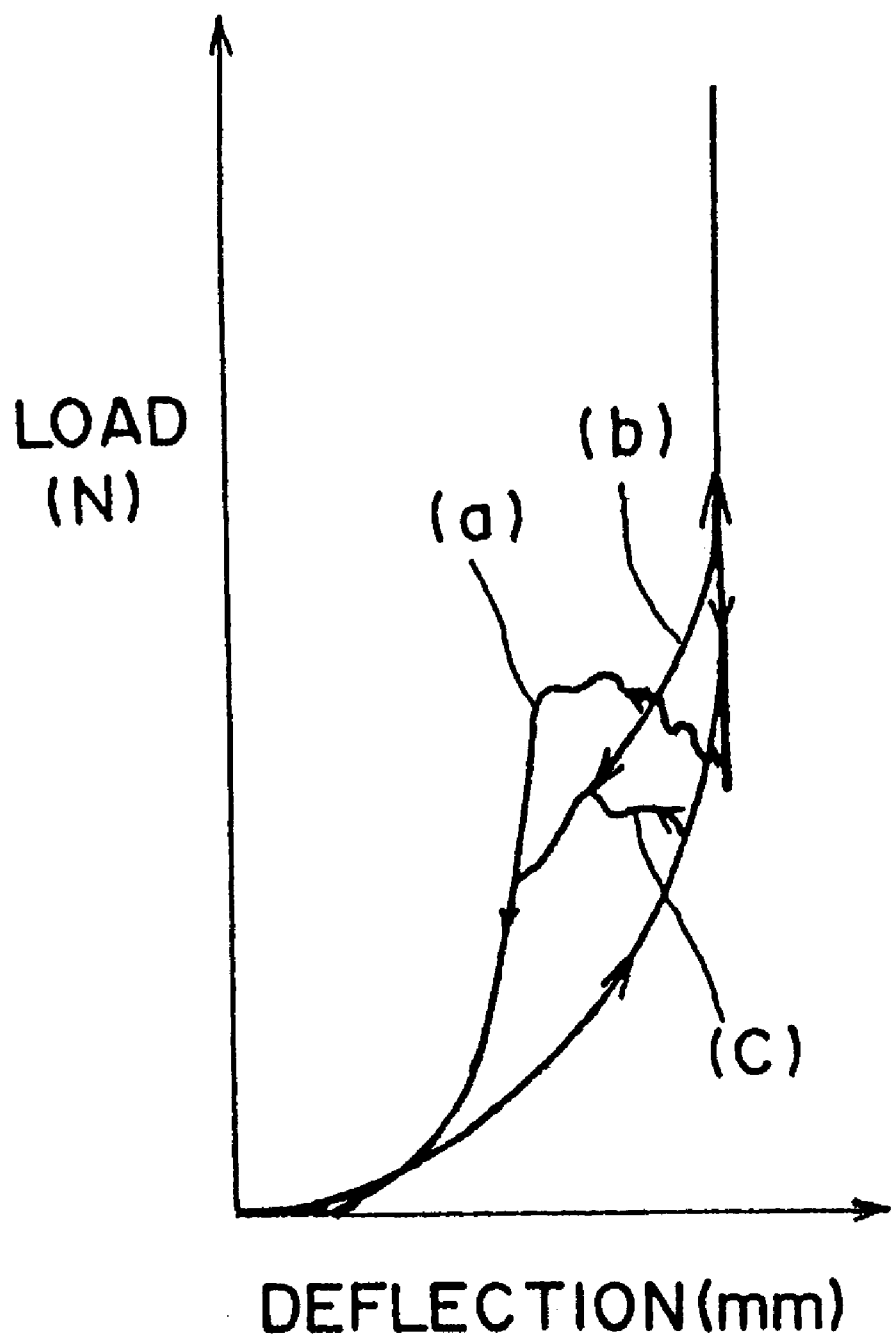
FIG. 3 is a graph showing a relationship between the load measured and the deflection.

In FIG. 3, (a) is a curve obtained when a constant load was applied, and the time during which the load was being applied becomes shorter in the order of (a), (b) and (c). In other words, the static characteristics vary according to the manner in which the load is applied, and the longer the time during which the load is applied, the greater the impulse.

As for rare-earth magnets, the strength of magnetization does not depend upon the magnetic field. More specifically, because the internal magnetic moment is not easily influenced by the magnetic field, the strength of magnetization on a demagnetization curve hardly changes, and the value is kept almost the same as that of saturation magnetization.

Accordingly, in the case of rare-earth magnets, the force can be calculated using a charge model assuming that the magnetic load is uniformly distributed on its surfaces.

Figure 4A:
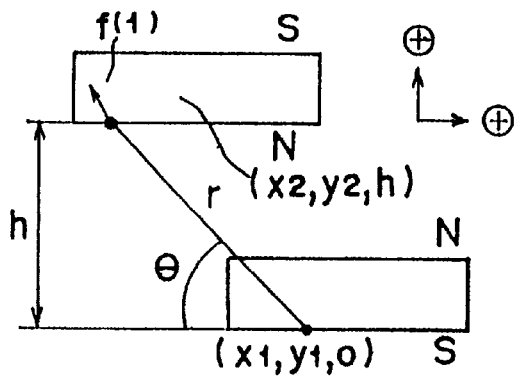
FIG. 4A is a schematic diagram depicting the way of thinking of input and output in a charge model assuming that magnetic charges are uniformly distributed on end surfaces of the permanent magnets, and particularly showing attraction.
Figure 4B:
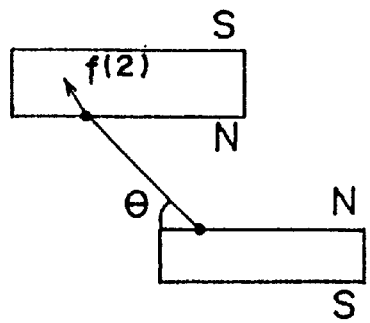
FIG. 4B is a diagram similar to FIG. 4A, but particularly showing repulsion.
Figure 4C:
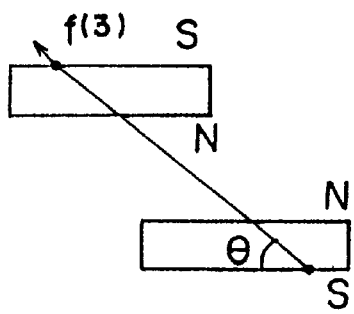
FIG. 4C is a diagram similar to FIG. 4A, but particularly showing repulsion at locations different from those shown in FIG. 4B.

FIG. 4 depicts the way of thinking in which a magnet is defined as a set of smallest unit magnets. The relationship of forces acting among the unit magnets was calculated by classifying it into three.

(a) Attraction (because the unit magnets are identical in both r and m, two types are defined by one)

$$f^{(1)} = (m^2/r^2) dx_1 dy_1 dx_2 dy_2$$

$$f_x^{(1)} = f^{(1)} \cos\theta$$

$$f_z^{(1)} = f^{(1)} \sin\theta$$

(b) Repulsion $$f_x^{(2)} = f^{(2)} \cos\theta$$

$$f_z^{(2)} = f^{(2)} \sin\theta$$

(c) Repulsion $$f_x^{(3)} = f^{(3)} \cos\theta$$

$$f_z^{(3)} = f^{(3)} \sin\theta$$

Accordingly, $$-f_x = 2f_x^{(1)} - f_x^{(2)} - f_x^{(3)}$$

$$-f_z = 2f_z^{(1)} - f_z^{(2)} - f_z^{(3)}$$

Hereupon, the Coulomb's law is expressed by:

| | |
|---|---|
| $F = k(q_1 q_2 / r^2)$ | r: distance |
| $q = MS$ | q1, q2: magnetic charge |
| | M(m): strength of magnetization |
| | S: area |

The forces can be obtained by integrating the above ($-f_x$) and ($-f_z$) with respect to the range of the magnet size.

Figure 6:
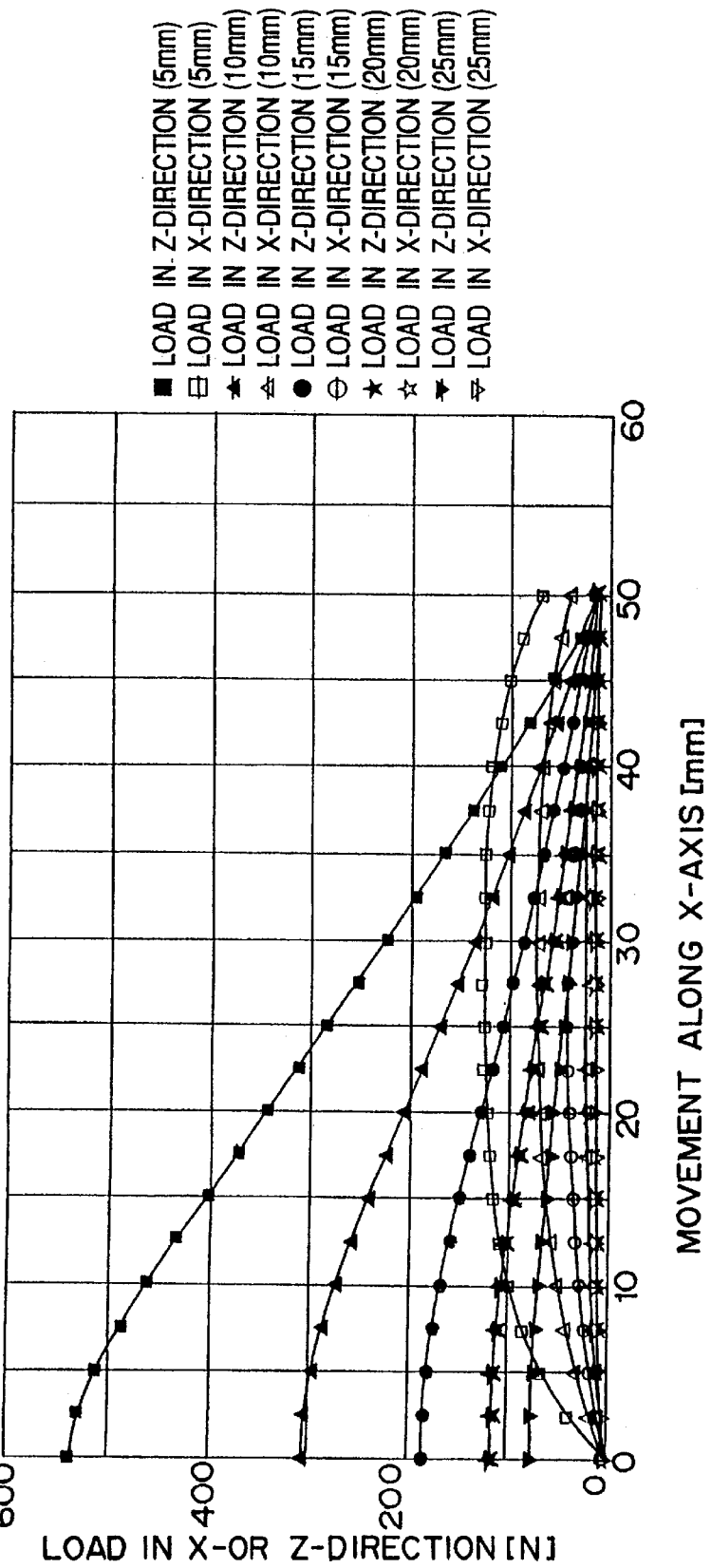
FIG. 6 is a graph showing the load in X-axis and Z-axis directions relative to the amount of movement in the X-axis direction when calculation has been carried out based on FIG. 5.

As shown in FIG. 5, calculation was carried out for each magnetic gap by moving one of two opposing magnets relative to the other from the condition in which they are completely lapped (the length of movement x=0 mm) to the condition in which one of them is completely slipped (the length of movement x=50 mm). The results the calculation are shown in FIG. 6. Although the internal magnetic moment is defined as being constant, it is somewhat corrected because disorder is caused around the magnets when the magnetic gap is small.

The above results of calculation are generally in agreement with the results of actual measurement. The force required for moving the point (a) to the point (b) in FIG. 2 is the x-axis load, while the output is represented by the z-axis load. The relationship of input<output caused by instability is statically clarified.

Figure 7:
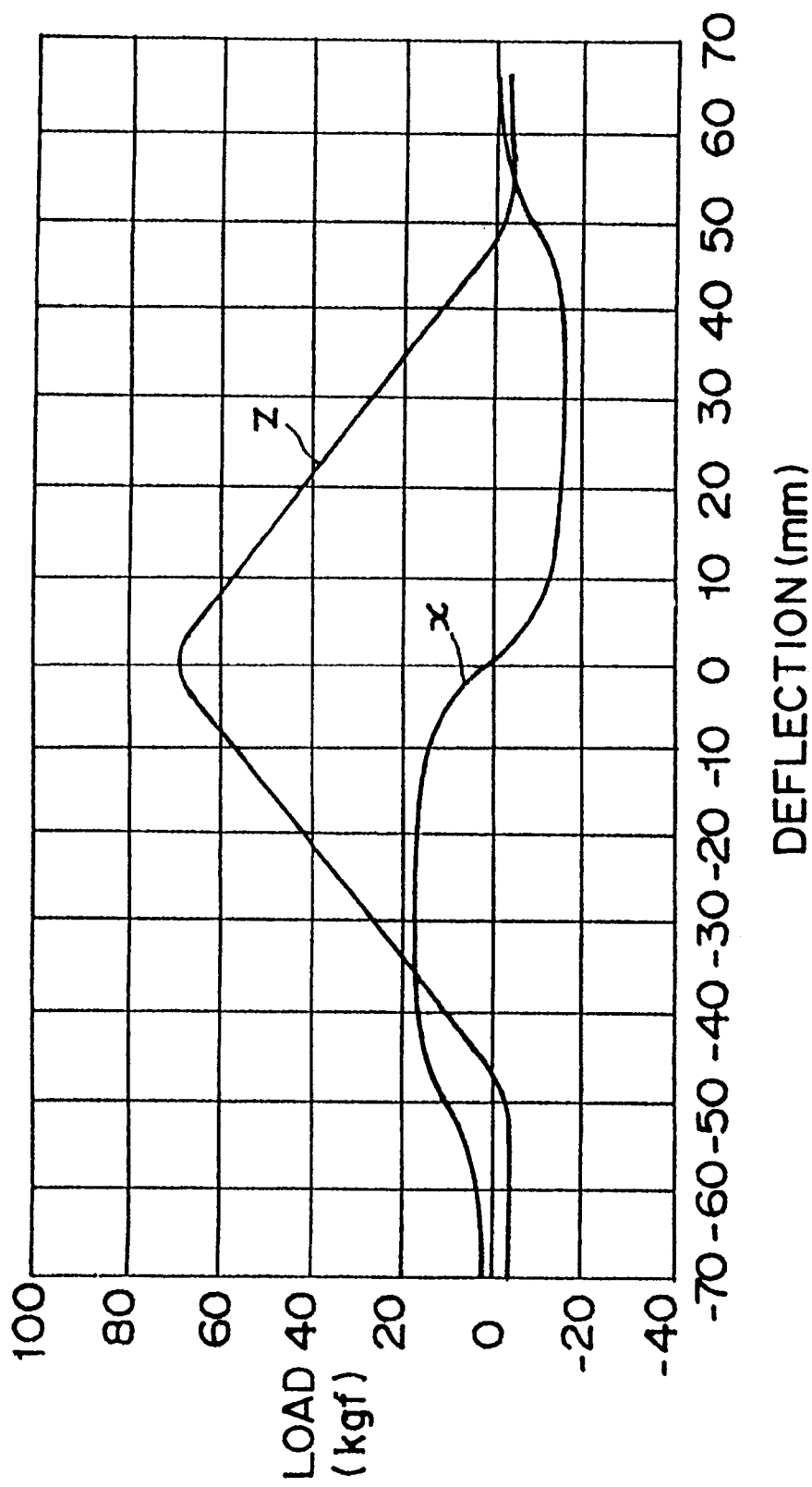
FIG. 7 is a graph showing a relationship between the load and deflection when the distance between the permanent magnets of FIG. 5 is kept constant, and one of the magnets is moved relative to the other from the completely slipped condition to the completely lapped one, and again to the completely slipped one.

FIG. 7 is a graph indicating a relationship between the x-axis load and the z-axis load when the distance between the magnets is kept 3 mm, and the condition of the magnets is changed from the completely slipped condition to the completely lapped one, and again to the completely slipped one. This graph is a characteristic curve indicating that the absolute value of the x-axis load is the same but the direction of output is reversed. When one of the magnets is moved relative to the other to approach the completely lapped condition, the former receives a resistance, resulting in damping. On the other hand, when one of the magnets are moved relative to the other from the completely lapped condition to the completely slipped condition, the former is accelerated.

Figure 8:
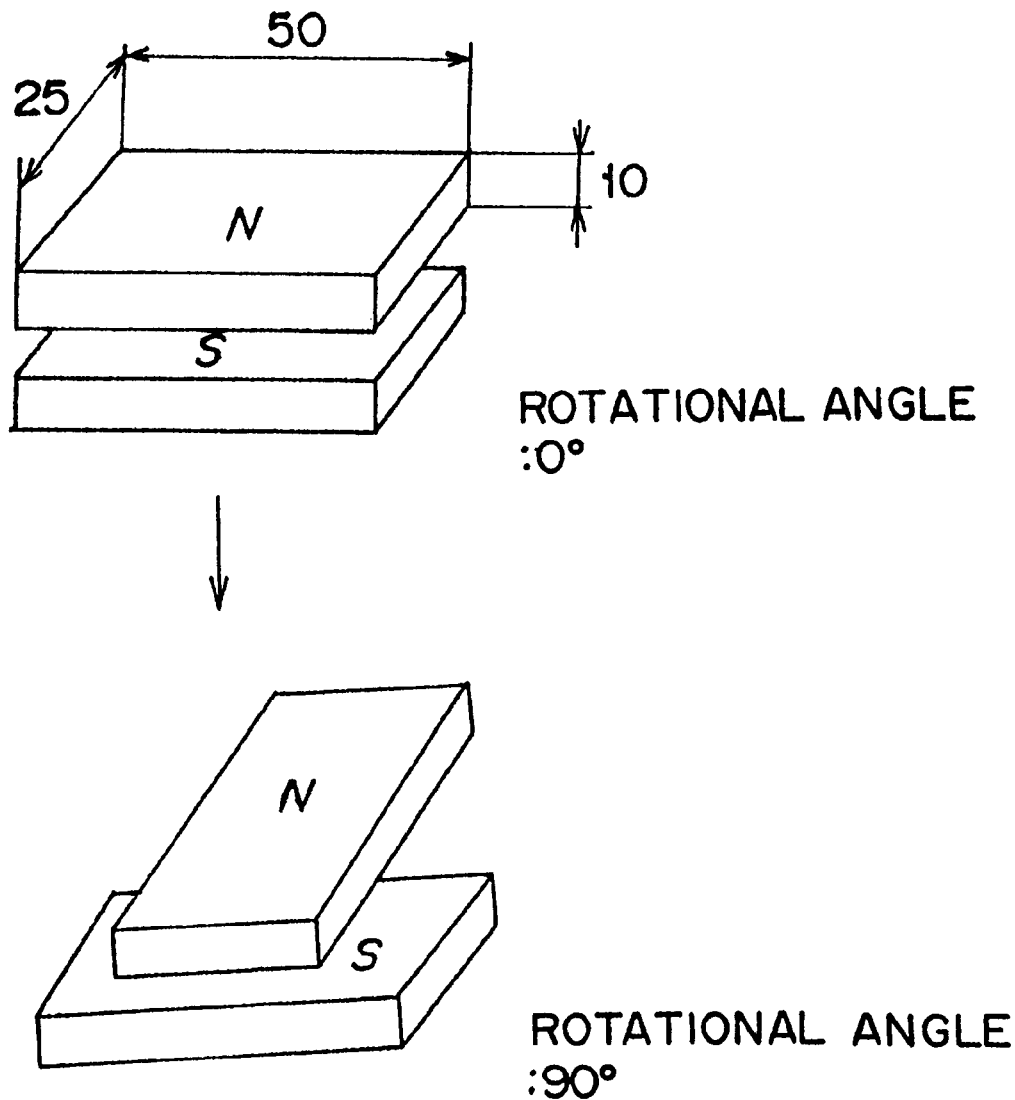
FIG. 8 is a schematic diagram depicting mutually spaced permanent magnets with the same magnetic poles opposed to each other and also depicting the case where one of the magnets is rotated relative to the other (to change the opposing area thereof)
Figure 9:
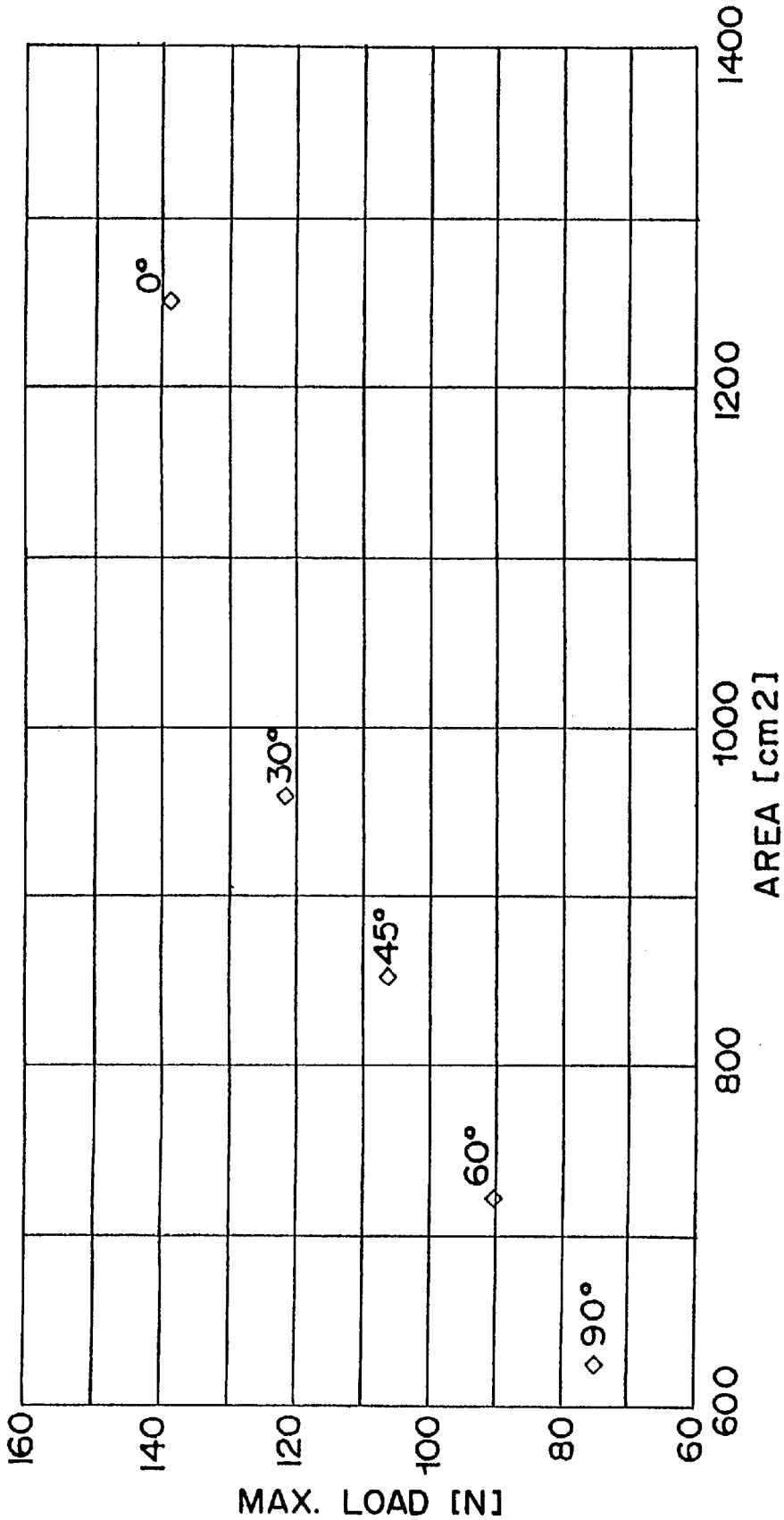
FIG. 9 is a graph showing the maximum load relative to the opposing area when one of the magnets is rotated, as shown in FIG. 8.

When the rotational angle of the opposing magnets is changed as shown in FIG. 8, a graph shown in FIG. 9 is obtained. As a matter of course, the maximum load decreases as the opposing area decreases. This graph indicates that the output can be changed through an area conversion which can be performed by applying a predetermined input.

Figure 10:
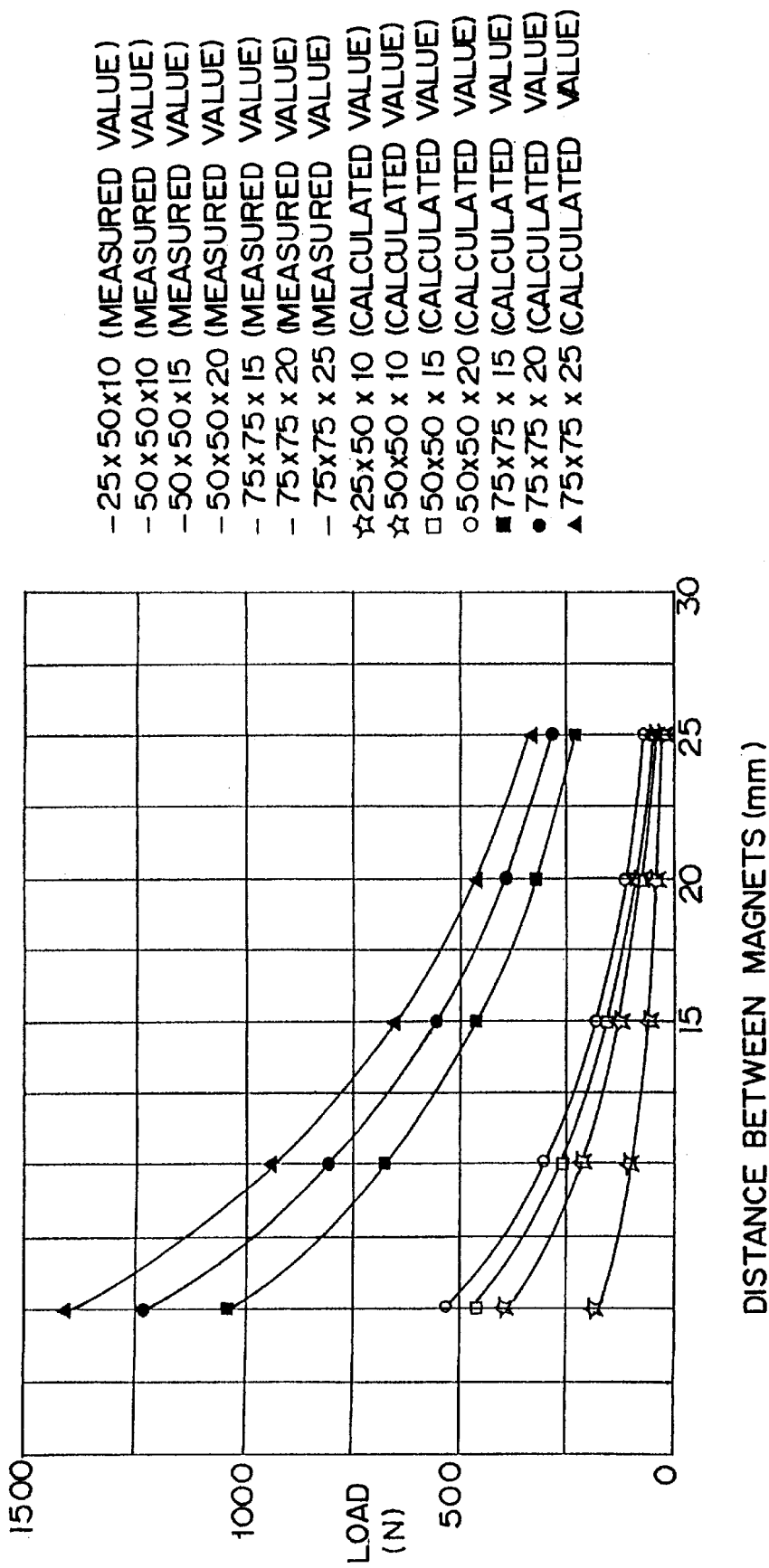
FIG. 10 is a graph showing a relationship between the load and the distance between the magnets when neodymium-based magnets are employed.

FIG. 10 is a graph indicating a relationship between the load and the distance between the magnets when neodymium-based magnets are employed. The repulsive force increases with an increase in mass. The repulsive force F is given by:

F $Br^2 \times$(geometric dimensions)

Br: strength of magnetization

The geometric dimensions mean the size determined by the distance between the opposing magnets, the opposing area, the magnetic flux density, the strength of the magnetic field or the like. If the magnet material is the same, the strength of magnetization (Br) is constant and, hence, the repulsive force of the magnets can be changed by changing the geometric dimensions.

Figure 11:
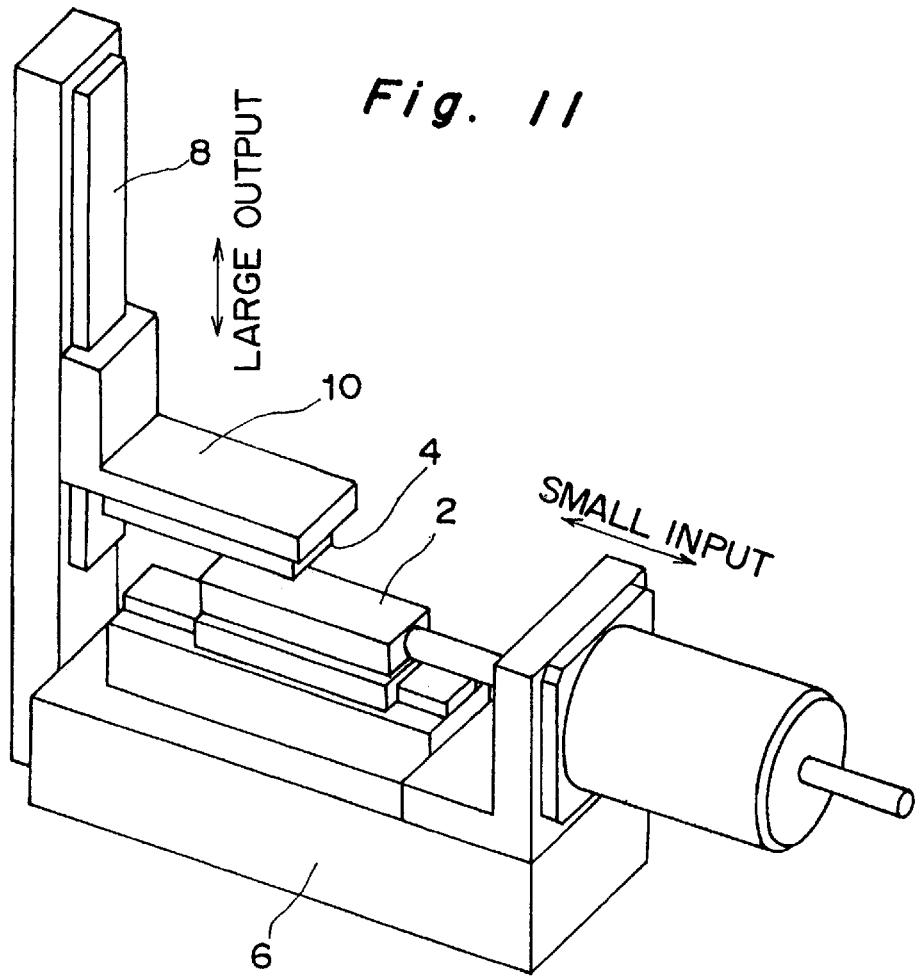
FIG. 11 is a perspective view of a sliding-type principle model in which geometric dimensions between the two permanent magnets are changed by changing the opposing area thereof.

FIG. 11 depicts a sliding-type principle model wherein the geometric dimensions are changed by sliding one of two permanent magnets 2, 4 relative to the other to change the opposing area thereof.

As shown in FIG. 11, the permanent magnet 2 is slidably mounted on a base 6 to which a linear slider 8 is secured so as to extend vertically. An L-shaped member 10 is vertically slidably mounted on the linear slider 8. The permanent magnet 4 is secured to the lower surface of the L-shaped member 10 so as to confront the permanent magnet 2 with the same magnetic poles opposed to each other.

In the sliding-type principle model of the above-described construction, when permanent magnets of a size of 50 mmL×25 mmW×10 mmH (Trade name: NEOMAX-39SH) were used for the permanent magnets 2, 4 and a load having a total weight of about 3.135 kg was used, and when the permanent magnet 2 was caused to slide relative to the permanent magnet 4, a graph as shown in FIG. 12 was obtained.

Figure 12:
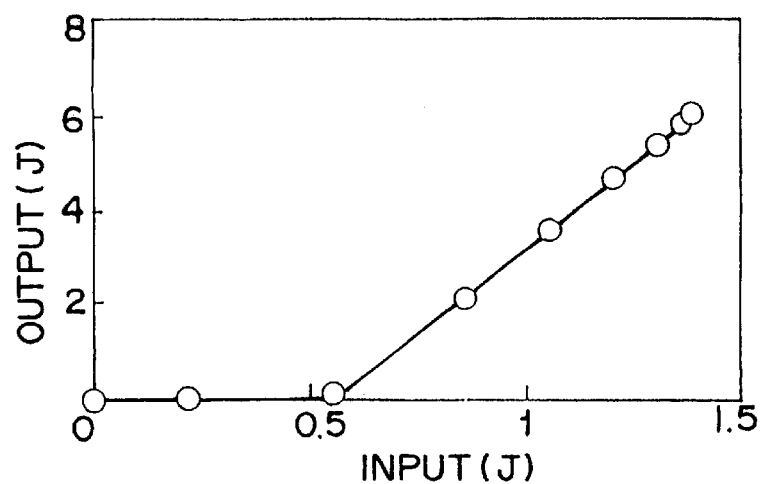
FIG. 12 is a graph showing a relationship between input and output obtained from the sliding-type principle model of FIG. 11.

The graph of FIG. 12 depicts a relationship between experimental values of input work and those of output work. As can be seen therefrom, an output work of about 4 J is obtained from an input work of about 0.5 J. This means that a relatively large output work can be derived from a relatively small input by making use of negative damping characteristics which the magnetic spring made up of the two opposing permanent magnets 2, 4 has, or by changing static magnetic energy.

Figure 13:
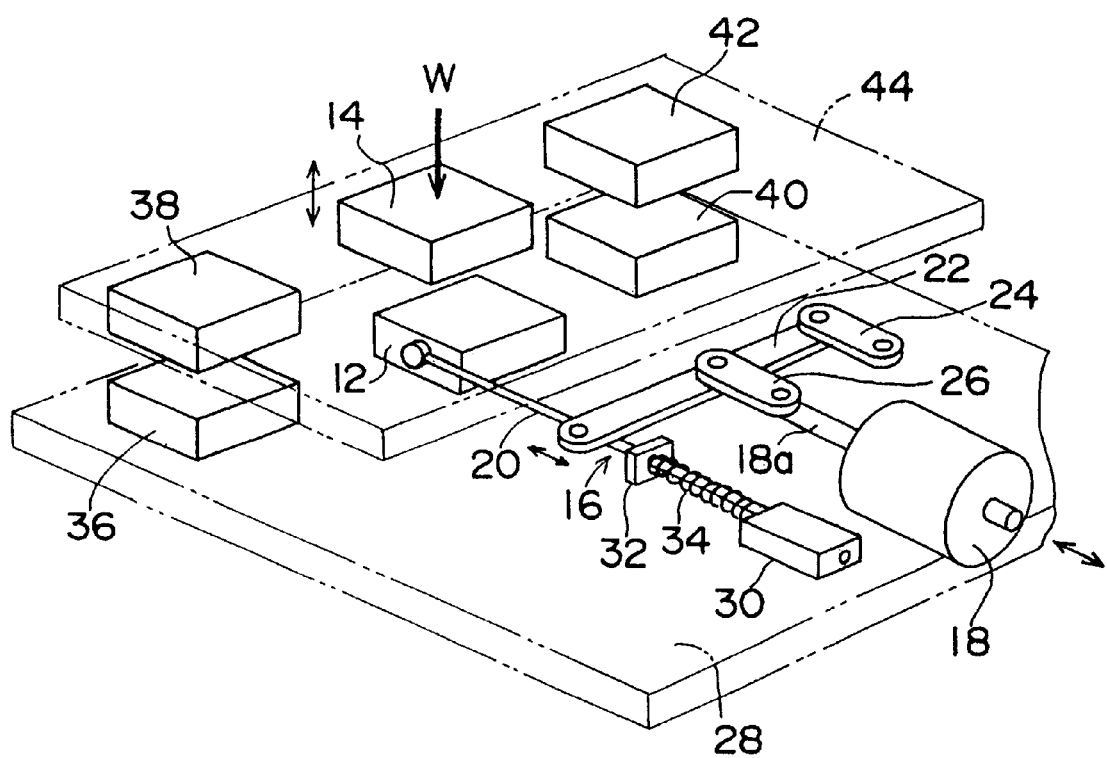
FIG. 13 is a schematic perspective view of a first vibration generating mechanism to which the sliding-type principle model of FIG. 11 is applied.

FIG. 13 depicts a first vibration generating mechanism to which the sliding-type principle model referred to above is applied.

The vibration generating mechanism of FIG. 13 includes a slidable first permanent magnet 12, a vertically movable second permanent magnet 14 spaced a predetermined distance from the first permanent magnet 12, a link mechanism 16 coupled to the first permanent magnet 12, and a drive source 18 such as, for example, a voice coil motor (VCM) for sliding the first permanent magnet 12 via the link mechanism 16. The first and second permanent magnets 12, 14 are placed with the same (repulsive) magnetic poles opposed to each other. The link mechanism 16 includes a rod 20 connected at its one end to the first permanent magnet 12, a first lever 22 pivotally connected at its one end to an intermediate portion of the rod 20, a second lever 24 pivotally connected at its one end to the other end of the first lever 22, and a third lever 26 pivotally connected at its one end to an intermediate portion of the first lever 22. The other end of the second lever 24 is pivotally connected to, for example, a base plate 28, while the other end of the third lever 26 is pivotally connected to a reciprocating shaft 18a of the drive source 18. The other end of the rod 20 remote from the first permanent magnet 12 is loosely received within a rod holder 30, and a spring 34 employed as a load adjusting means is wound around the rod 20 between the rod holder 30 and a stopper 32 secured to the rod 20.

In the above-described construction, when the first permanent magnet 12 is moved horizontally reciprocatingly by the drive source 18 via the link mechanism 16 with a load W applied to the second permanent magnet 14, the second permanent magnet 14 is moved vertically reciprocatingly. That is, the vibration generating mechanism of FIG. 13 causes excitation and generates a vertically periodic vibration by changing the opposing area of the two permanent magnets 12, 14.

A pair of permanent magnets 36, 38 having the same magnetic poles opposed to each other and another pair of permanent magnets 40, 42 having the same magnetic poles opposed to each other may be disposed on respective sides of the two permanent magnets 12, 14 in compliance with the magnitude of the load W applied to the second permanent magnet 14. In this construction, when the second permanent magnet 14 and the permanent magnets 38, 42 disposed on respective sides thereof are secured to, for example, a top plate 44 that is mounted vertically movably on the base plate 28 via a plurality of vertically extending shafts, the load W is subjected to a periodic vibration.

More specifically, the stationary magnets 36, 38, 40, 42 act to support the load W, while a sliding movement of the exciting magnet (the first permanent magnet 12) causes the vertical vibration. At this moment, the balanced point of the second permanent magnet 14 relative to the first permanent magnet 12 and the amplitude of the second permanent magnet 14 are provisionally determined by the volume of the first and second permanent magnets 12, 14. The amount of stroke of the exciting magnet 12 is set depending on a load-deflection curve, the amplitude, and the loaded mass. The center of stroke of the exciting magnet 12 is a reference position to determine a neutral position of the drive source 18. The determination of such a neutral position is made by setting a "valley of load" with the use of an assisting mechanism such as the load adjusting spring 34 and the like. The "valley of load" creates a balanced position where a horizontal load applied to the exciting magnet 12 via the second permanent magnet 14 is cancelled by the assisting mechanism for the drive source 18.

Furthermore, the top dead point and the bottom dead point of the second permanent magnet 14 are determined depending on the amount of stroke of the exciting magnet 12 in the horizontal direction, while vertical and horizontal loads at each of the top and bottom dead points are determined depending on the amount of lapping of the exciting magnet 12 relative to the second permanent magnet 14 and the amount of gap therebetween. The spring constant of the assisting mechanism for the drive source 18 is determined depending on the horizontal load at each of the top and bottom dead points.

Figure 14:
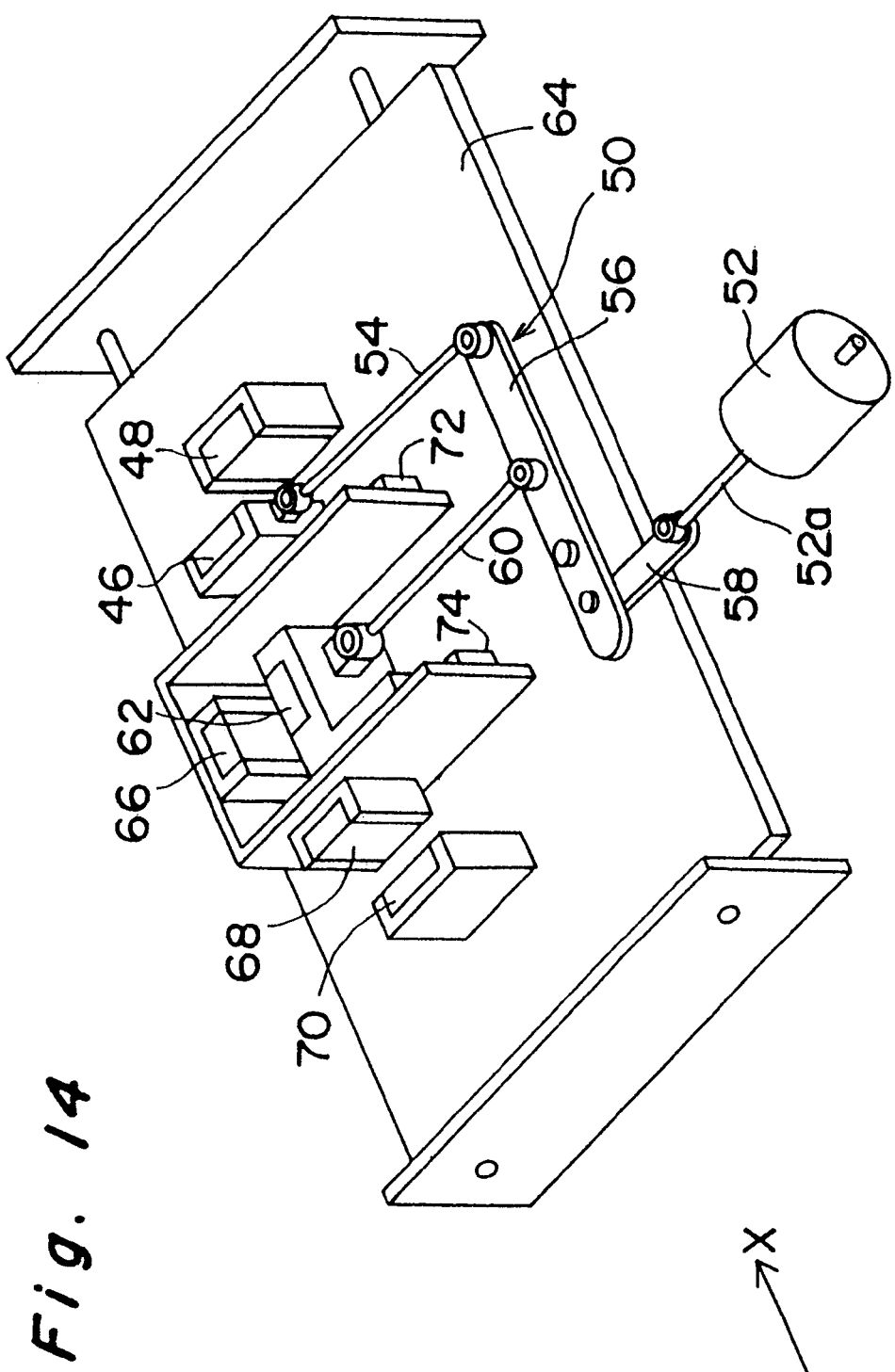
FIG. 14 is a schematic perspective view of a second vibration generating mechanism to which the sliding-type principle model of FIG. 11 is applied.

FIG. 14 depicts a second vibration generating mechanism to which the sliding-type principle model is applied.

The vibration generating mechanism of FIG. 14 includes a first permanent magnet 46 freely slidable in the Y-axis direction, a second permanent magnet 48 spaced a predetermined distance from the first permanent magnet 46 and freely movable in the X-axis direction relative to the first permanent magnet 46, a link mechanism 50 coupled to the first permanent magnet 46, and a drive source 52 such as, for example, a VCM for sliding the first permanent magnet 46 via the link mechanism 50. The first and second permanent magnets 46, 48 are placed with the same magnetic poles opposed to each other. The link mechanism includes a first rod 54 having one end connected to the first permanent magnet 46, a first lever 56 having one end pivotally connected to the other end of the first rod 54, a second lever 58 having one end pivotally connected to the other end of the first lever 56, and a second rod 60 having one end pivotally connected to an intermediate portion of the first lever 56. The other end of the second rod 60 is connected to a third permanent magnet 62 freely slidable in the Y-axis direction, while the other end of the second lever 58 is connected to a reciprocating shaft 52a of the drive source 52. Also, the first lever 56 is pivotally connected to a base 64 at a location between a connecting portion thereof with the second lever 58 and a connecting portion thereof with the second rod 60.

A fourth permanent magnet 66 is spaced from the third permanent magnet 62 in the Y-axis direction with the same magnetic poles opposed to each other, while mutually spaced fifth and sixth permanent magnets 68, 70 are disposed on a side of the third permanent magnet 62 remote from the first permanent magnet 46 so that one of the fifth and sixth permanent magnets 68, 70 may be freely movable relative to the other in the X-axis direction.

In the above-described construction, when the second permanent magnet 48 and the sixth permanent magnet 70 are secured to a top plate (not shown) that extends parallel to the base 64 and is spaced a predetermined distance therefrom, and when the first permanent magnet 46 is reciprocatingly moved in the Y-axis direction by the drive source 52 via the link mechanism 50, one of the base and the top plate is reciprocatingly moved relative to the other in the X-axis direction. That is, the vibration generating mechanism of FIG. 14 causes excitation and generates a horizontally periodic vibration by changing the opposing area of the two permanent magnets 46, 48.

In FIG. 14, reference numerals 72 and 74 denote sliders on which the movable permanent magnets, i.e., the first and third permanent magnets 46, 62 are slidably mounted.

The vibration generating mechanism of the above-described construction is further explained hereinafter.

The volume of the movable magnet (the first permanent magnet 46) for causing a horizontal vibration (the X-axis direction in FIG. 14) is determined depending on the amplitude of vibration. The load characteristics that satisfy the load conditions and vibration acceleration are determined from a relationship between the amount of lapping of the movable magnet 46 relative to the second permanent magnet 48 and the amount of gap therebetween. The load value of the balancing magnet (the third permanent magnet) 62 is appropriately determined based on the load conditions at the neutral or balanced position where the counterforce (the horizontal load applied to the movable magnet 46) is cancelled. A load-deflection curve is determined based on the counter force to be applied to the movable magnet 46 in the sliding direction at the maximum amplitude points in both the X- and Y-axis directions, the input from the drive source 52, and a load applied to the balancing magnet 62. Based on the load-deflection curve, the movable range and the volume of the balancing magnet 62 are determined in consideration of the lever ratio of the link mechanism associated with the movable magnets 46, 62.

The vibration generating mechanism of FIG. 13 or 14 is controlled as follows.

Figure 15:
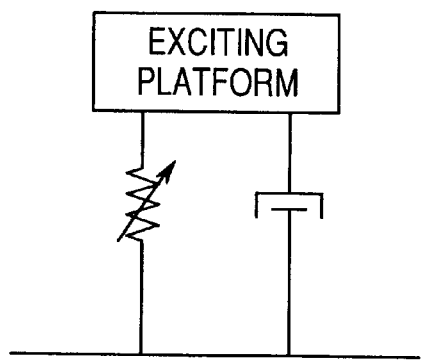
FIG. 15 is a schematic view of a mechanical model of the vibration generating mechanism according to the present invention.

Sine waves, random waves or the like are generally used for drive waves of the drive source 18, 52. As shown in a mechanical model of FIG. 15, a sensor such as, for example, a potentiometer for sensing the motion of the drive source 18, 52 is required to feed-back control the position or acceleration of the drive source 18, 52 to be a target position or acceleration.

When the sine waves are used for the drive waves, a position sensor such as a rotary encoder or a potentiometer is required to sense the motion of the exciting platform (the top plate 44 in FIG. 13, or the top plate or the base 64 in FIG. 14) for subsequent control of the amplitude thereof, while an acceleration sensor is required to sense the acceleration of the exciting platform for subsequent control of the acceleration thereof. On the other hand, when the random waves are used for the drive waves, a position sensor such as a rotary encoder or the like is required to sense the motion of the exciting platform.

Figure 16:
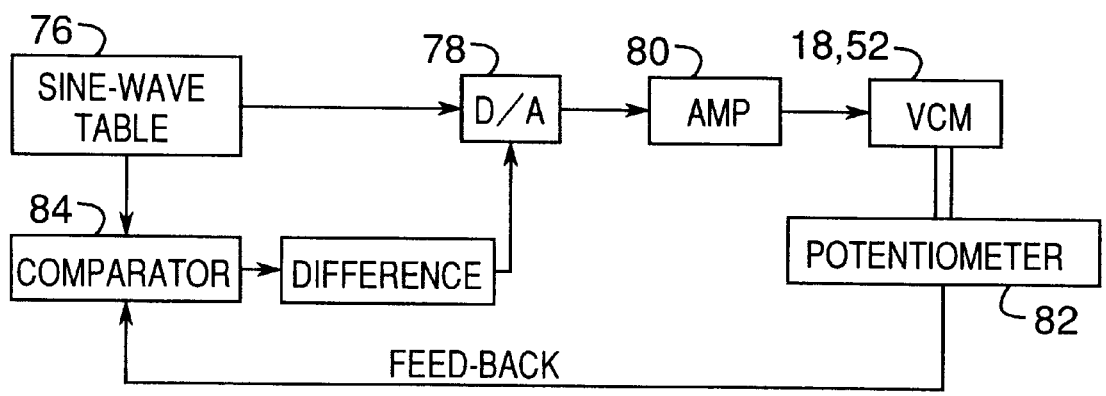
FIG. 16 is a block diagram showing a closed-loop control when a VCM is used for a drive source of the vibration generating mechanism and is driven with sine waves.
Figure 17:
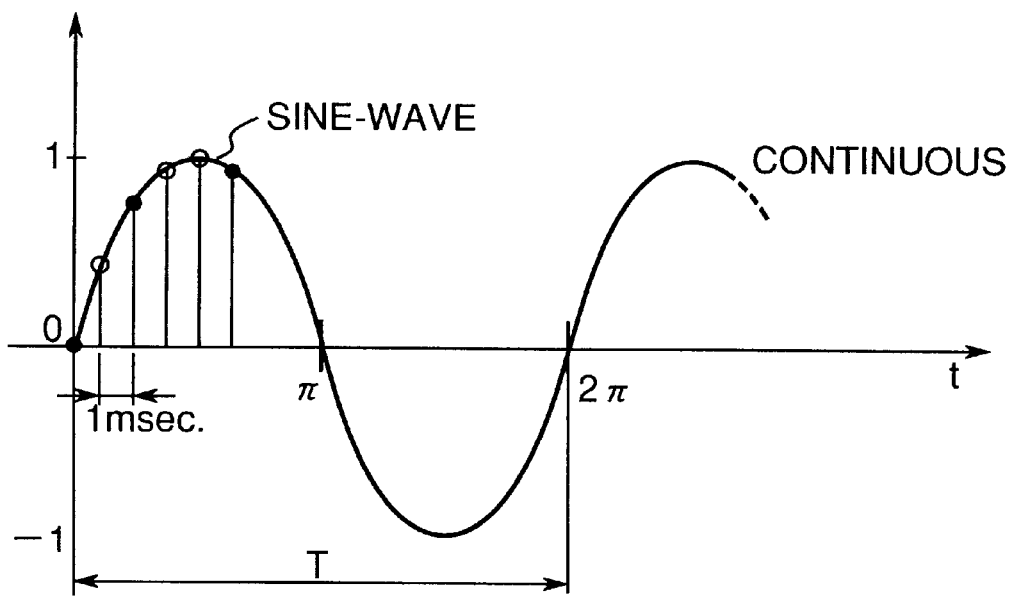
FIG. 17 is a graph of the sine waves employed as drive waves.

FIG. 16 is a block diagram depicting a closed-loop control when a VCM is used for the drive source 18, 52 and is controlled with sine waves shown in FIG. 17.

In FIG. 16, data is first outputted from a sine-wave table 76 to a digital-analogue converter (D/A) 78 at a predetermined timing (for example, every 1 msec), and a voltage value of the D/A 78 is inputted to an amplifier 80 such as, for example, a pulse-width modulation (PWM) control amplifier, thereby driving the VCM 18, 52. A comparator 84 compares the output from the sine-wave table 76 with a value indicated by a potentiometer 82 that is connected to the VCM 18, 52, and a difference therebetween is outputted to the D/A 78 so that the VCM 18, 52 may be driven to a target position.

The sine-wave table 76 may be electrically connected to, for example, a personal computer. In that case, a START command from the personal computer causes the sine-wave table 76 to output predetermined sine waves and continue outputting until a STOP or CLEAR command is received.

Figure 18:
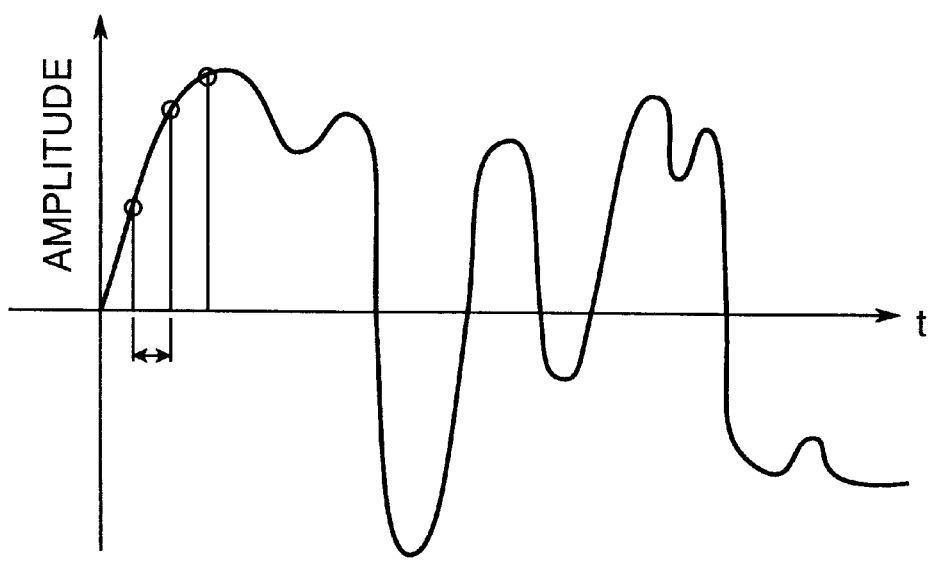
FIG. 18 is a graph similar to FIG. 17, but depicting random waves employed as the drive waves.

Random waves as shown in FIG. 18 can be used for the drive waves. In that case, based on a START command sent from the personal computer, a value of amplitude is outputted from the amplifier 80 to the VCM 18, 52 at a predetermined timing for a subsequent closed-loop control in which the VCM 18, 52 is set to the target position. Such output is maintained until next data is sent from the amplifier 80.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A vibration generating mechanism comprising:

a first permanent magnet having a first magnetic pole of a first polarity on a face of said first permanent magnet and a second magnetic pole of a second polarity on said face of said first permanent magnet;

a second permanent magnet having a first magnetic pole of the first polarity on a face of said second permanent magnet and a second magnetic pole of the second polarity on said face of said second permanent magnet, wherein said first and second permanent magnets are spaced vertically from each other and oriented such that the magnetic pole of the first polarity of said first permanent magnet is opposed to the magnetic pole of the first polarity of said second permanent magnet and such that the magnetic pole of the second polarity of said first permanent magnet is opposed to the magnetic pole of the second polarity of said second permanent magnet;

third and fourth permanent magnets arranged on a first side of said first and second permanent magnets, each having a magnetic pole of the first polarity and a magnetic pole of the second polarity, vertically spaced from each other and oriented such that the magnetic pole of the first polarity of said third permanent magnet is opposed to the magnetic pole of the first polarity of said fourth permanent magnet so as to exhibit a repulsive force;

fifth and sixth permanent magnets arranged on a second side of said first and second permanent magnets, each having a magnetic pole of the first polarity and a magnetic pole of the second polarity, vertically spaced from each other and oriented such that the magnetic pole of the first polarity of said fifth permanent magnet is opposed to the magnetic pole of the first polarity of said sixth permanent magnet so as to exhibit a repulsive force;

a link mechanism coupled to said first permanent magnet;

a load adjuster coupled to said link mechanism operable to cancel a horizontal load applied to said first permanent magnet; and a drive source operable to move said first permanent magnet, via said link mechanism, in a periodic and reciprocating motion relative to said second permanent magnet such that an opposing area of said first and second permanent magnets is changed causing said second permanent magnet to vibrate relative to said first permanent magnet;

wherein the repulsive force between said third and fourth permanent magnets, and the repulsive force between said fifth and sixth permanent magnets, are capable of supporting a load applied vertically to said second permanent magnet.

2. A vibration generating mechanism comprising:

a first permanent magnet having a first magnetic pole of a first polarity on a face of said first permanent magnet and a second magnetic pole of a second polarity on said face of said first permanent magnet;

a second permanent magnet having a first magnetic pole of the first polarity on a face of said second permanent magnet and a second magnetic pole of the second polarity on said face of said second permanent magnet, wherein said first and second permanent magnets are spaced from each other in a first horizontal direction and oriented such that the magnetic pole of the first polarity of said first permanent magnet is opposed to the magnetic pole of the first polarity of said second permanent magnet and such that the magnetic pole of the second polarity of said first permanent magnet is opposed to the magnetic pole of the second polarity of said second permanent magnet;

third and fourth permanent magnets arranged on one side of said first and second permanent magnets, each having a magnetic pole of the first polarity and a magnetic pole of the second polarity, spaced from each other in the first horizontal direction and oriented such that the magnetic pole of the first polarity of said third permanent magnet is opposed to the magnetic pole of the first polarity of said fourth permanent magnet so as to exhibit a repulsive force;

a link mechanism coupled to said first permanent magnet; and a drive source operable to move said first permanent magnet, via said link mechanism, in a periodic and reciprocating motion relative to said second permanent magnet such that an opposing area of said first and second permanent magnets is changed causing said second permanent magnet to vibrate relative to said first permanent magnet in the first horizontal direction and causing said third and fourth permanent magnets to vibrate relative to each other in the first horizontal direction.

3. A vibration generating mechanism as claimed in claim 2, further comprising:

fifth and sixth permanent magnets, each having a magnetic pole of the first polarity and a magnetic pole of the second polarity, spaced from each other in a second horizontal direction generally perpendicular to the first horizontal direction and oriented such that the magnetic pole of the first polarity of said third permanent magnet is opposed to the magnetic pole of the first polarity of said fourth permanent magnet so as to exhibit a repulsive force, wherein one of said fifth and sixth permanent magnets is connected to said link mechanism so that a load applied to said first permanent magnet in the second horizontal direction is balanced by the repulsive force between said fifth and sixth permanent magnets.

* * * * *